United States Patent
Hühn

(10) Patent No.: US 11,452,301 B2
(45) Date of Patent: *Sep. 27, 2022

(54) COCOA EXTRACTS, COCOA PRODUCTS AND METHODS OF MANUFACTURING THE SAME

(71) Applicant: ODC Lizenz AG, Stans (CH)

(72) Inventor: Tilo Hühn, Schönenberg (CH)

(73) Assignee: ODC LIZENZ AG, Stans (CH)

( * ) Notice: Subject to any disclaimer, the term of this patent is extended or adjusted under 35 U.S.C. 154(b) by 291 days.

This patent is subject to a terminal disclaimer.

(21) Appl. No.: 15/742,446

(22) PCT Filed: Jul. 8, 2016

(86) PCT No.: PCT/EP2016/001180
§ 371 (c)(1),
(2) Date: Jan. 5, 2018

(87) PCT Pub. No.: WO2017/005372
PCT Pub. Date: Jan. 12, 2017

(65) Prior Publication Data
US 2018/0206517 A1    Jul. 26, 2018

(30) Foreign Application Priority Data
Jul. 8, 2015 (EP) .................................... 15002047

(51) Int. Cl.
| | | |
|---|---|---|
| A23G 1/00 | (2006.01) | |
| A23G 1/04 | (2006.01) | |
| A23G 1/30 | (2006.01) | |
| A23G 1/56 | (2006.01) | |
| A23G 1/32 | (2006.01) | |

(52) U.S. Cl.
CPC ........... *A23G 1/002* (2013.01); *A23G 1/0016* (2013.01); *A23G 1/0036* (2013.01); *A23G 1/047* (2013.01);
(Continued)

(58) Field of Classification Search
None
See application file for complete search history.

(56) References Cited

U.S. PATENT DOCUMENTS

2007/0077318 A1    4/2007    Pons-Andreu et al.

FOREIGN PATENT DOCUMENTS

| EP | 0 711 505 A1 | 5/1996 |
| EP | 0 796 832 A1 | 9/1997 |

(Continued)

OTHER PUBLICATIONS

Anonymous, "41. Folin Ciocalteu Index," *Official Journal of the European Communities* 33(L 272):178-179, Oct. 3, 1990.
(Continued)

*Primary Examiner* — Elizabeth Gwartney
(74) *Attorney, Agent, or Firm* — Seed IP Law Group LLP

(57) ABSTRACT

Disclosed is a method for processing cocoa beans or nibs comprising the steps of: (a) adding water to cocoa beans or nibs to form a suspension; (b) wet grinding said suspension; (c) subjecting said suspension to a heat treatment at a temperature of 70° C. or less; (d) separating the suspension into: a water phase (heavy phase), a fat phase (light phase) comprising cocoa butter, and a solid phase comprising cocoa powder and fluid components; (e) continuously separating the fluid components from the solid phase obtained in step (d) to obtain cocoa aroma and cocoa powder by supplying a flow of said solid phase to a mixing device; wherein the mixing device comprises: a cylindrical, tubular body with a horizontal axis having an inlet opening for the solid phase, an outlet opening for the dried solid phase and an optional outlet opening for a vapor phase comprising cocoa aroma; end plates closing the tubular body at its opposite ends; a coaxial jacket heating or cooling the internal wall of the tubular body to a temperature of from 55° C. to 150° C.; and
(Continued)

a bladed rotor, which is supported for rotation in the tubular body, its blades being arranged as a helix and oriented for centrifuging the solid phase and simultaneously transporting it towards the outlet opening.

16 Claims, 5 Drawing Sheets

(52) U.S. Cl.
 CPC ............... *A23G 1/30* (2013.01); *A23G 1/32* (2013.01); *A23G 1/56* (2013.01)

(56) References Cited

FOREIGN PATENT DOCUMENTS

| | | | |
|---|---|---|---|
| EP | 2 071 961 | A1 | 6/2009 |
| EP | 2 386 207 | A1 | 11/2011 |
| EP | 2 273 888 | B2 | 1/2016 |
| JP | 2003-204758 | A | 7/2003 |
| JP | 2006-313037 | A | 11/2006 |
| WO | 98/09533 | A1 | 3/1998 |
| WO | 03/045159 | A1 | 6/2003 |
| WO | 2010/073117 | A2 | 7/2010 |

OTHER PUBLICATIONS

Cooper et al., "Predictive Relationship between Polyphenol and Nonfat Cocoa Solids Content of Chocolate," *J. Agric. Food Chem.* 56:260-265, 2008.

Dragilev et al., *Confectionary Technology: Study Guide*, $2^{nd}$ Edition, Dehli, Moscow, Russia , pp. 378-389 (with partial English translation of p. 388), 2003, 9 pages.

Emelda et al., "High Levels of Flavonoids and HPLC Profile from Purified Extract of Cocoa Bean from West Sulawesi Indonesia," *International Journal of ChemTech Research* 6(4):2363-2367, 2014.

COCOA EXTRACTS, COCOA PRODUCTS AND METHODS OF MANUFACTURING THE SAME

FIELD OF INVENTION

This invention relates to improved methods and techniques for the production of cocoa extracts and chocolate or chocolate-like products. In certain embodiments, this invention relates to cocoa bean processing methods using cocoa beans which result in cocoa products, chocolate or chocolate-like products with improved taste characteristics and/or increased levels of antioxidants and/or vitamins.

BACKGROUND OF THE INVENTION

Cocoa (*Theobroma cacao L.*) is commonly known as an important source of healthy ingredients, such as e. g. minerals, vitamins, polyphenols (especially catechins, anthocyanidins and proanthocyanidins), and antioxidants such as flavonoids, so that a number of methods has been developed to improve the yield of said ingredients. For example, EP 2 071 961 A1 discloses a method for obtaining polyphenol-rich cocoa powder extracts.

The types of methods and the steps employed for processing cocoa beans into food products such as e.g. chocolate have a significant influence on the various qualities of the resulting cocoa products such as with respect to flavor, intensity, or anti-oxidant or vitamin content and even yield. For this reason, the method employed for processing cocoa beans into cocoa products (such as food stuffs) can be critically important to the commercial viability or success or acceptance of such products (in the marketplace, or in use for enhancement of other products).

Conventionally, the processing of cocoa beans initially involves the steps of harvesting cocoa pods, opening the pods to release the cocoa beans, followed by the fermenting and drying of the cocoa beans. Thereafter, the cocoa beans are cleaned, optionally broken into nibs and roasted, whereby the shells of the cocoa bean shells become brittle. While roasting conditions are generally selected depending on the variety of the cocoa bean, roasting is usually carried out by subjecting the cocoa beans or nibs to temperatures of from about 100° C. to 160° C. for around 15 minutes (at high temperatures) to a few hours (at lower temperatures), such as in the method disclosed in EP 2 273 888 B1, for example. Subsequently, the cocoa beans or nibs are subjected to grinding or mechanical extraction processes, such as the techniques disclosed in WO 03/045159 A1, for example. During these steps, high mechanical loads, shear stresses and/or frictional heat lead(s) to a destruction of cellular compartments of the raw cocoa materials, which results in liquefaction of cocoa fat and emulsification of oil-fat fractions. Usually, the resulting cocoa liquor is then mixed with cocoa butter, sugar, milk or further ingredients, depending on the individual manufacturer's formula, and optionally refined to produce a refined chocolate paste. Thereafter, the refined chocolate paste is subjected to conching, e.g. in accordance with the method of continuous conching according to EP 0 711 505 A1. Herein, a chocolate paste (usually comprising cocoa dry matter as well as cocoa butter, sugar and/or lecithin) refined in accordance with the above-mentioned conventional method is supplied into a mixing device comprising an outlet opening, which is connected by means of a duct with a separator device which separates air and moisture from the processed chocolate paste. The conched mass is then tempered under controlled conditions and molded.

However, such techniques are disadvantageous from the viewpoint of processability and recovery of desirable flavors and healthy ingredients, since after emulsification during grinding or mechanical extraction, separation of the oil-fat phase without the use of undesirable solvents (such as hexanol, for example), as well as obtaining or retaining desirable flavors and/or cocoa products such as aromatics, anti-oxidants, and/or vitamins is difficult if not impossible. In addition, dry roasting of beans/nibs involves a compromise regarding the yield and quality of flavor notes, since it is difficult to identify and monitor roasting conditions under which the flavor within the beans/nibs is fully developed without being decomposed and/or being driven out of the bean and lost with the exhaust gas during roasting.

WO 2010/073117 A2 discloses an alternative method for processing cocoa beans, which comprises the formation of a suspension comprising cocoa beans or nibs and water, wet grinding the suspended beans or nibs in multiple steps, heating the suspension, and decanting the same such that said suspension is separated into a water phase, a fat phase and a solid phase, in order to avoid liquefaction of the cocoa fat and formation of a chocolate liquor during mechanical processing. Said process employs lower temperatures and low shear forces, so that improvements in the retention of nutritionally beneficial components and the taste of the resulting cocoa products are achieved.

However, the use of water as an extraction solvent in the method of WO 2010/073117 A2 involves several challenges. For instance, during the course of the cocoa bean processing method, large amounts of added water have to be removed again, which may be energy-intensive, especially when drying and/or roasting the solid phase after decanting. Furthermore, since the process is carried out at relatively low temperatures, the drying step should proceed quickly, continuously and ideally with a high throughput in order to suppress the growth and/or propagation of microorganisms without requiring extensive sterilization or tyndallization treatments during the course of the process.

In this regard, it has been found that the use of conventional drum dryers for drying and/or roasting of the solid phase obtained after phase separation is problematic, since it is difficult to simultaneously minimize the thermal burden upon the solid phase (which is favourable when a high content of wholesome nutrients, such as e.g. polyphenols and vitamins is desired) and effect a development of rich roast and grill flavors and secondary aromas. In particular, drying the decanted solid phase with a drum dryer may require processing times in the order of several hours in order to obtain desired levels of roast/secondary flavors, which implicates a high thermal load on the solid phase even if the process is conducted under sub-atmospheric conditions.

Accordingly, the provision of methods and products that overcome the above disadvantages is desirable.

SUMMARY OF THE INVENTION

The present invention solves this object with the subject matter of the claims as defined herein. The advantages of the present invention will be further explained in detail in the section below and further advantages will become apparent to the skilled artisan upon consideration of the invention disclosure.

Generally speaking, in one aspect the present invention provides a method for processing cocoa beans or nibs comprising the steps of: (a) adding water to cocoa beans or nibs to form a suspension; (b) wet grinding said suspension; (c) subjecting said suspension to a heat treatment at a temperature of 70° C. or less; (d) separating the suspension into: a water phase (heavy phase) comprising aromatic flavors, a fat phase (light phase) comprising cocoa butter, and a solid phase comprising cocoa powder and fluid components; and a solid phase comprising cocoa powder and fluid components; (e) continuously separating the fluid components from the solid phase obtained in step (d) to obtain cocoa aroma and cocoa powder by supplying a flow of said solid phase to a mixing device, wherein the mixing device comprises: a cylindrical, tubular body with a horizontal axis having an inlet opening for the solid phase, an outlet opening for the dried solid phase and at least one outlet opening for a vapor phase; end plates closing the tubular body at its opposite ends; a coaxial jacket heating or cooling the internal wall of the tubular body to a temperature of from 55° C. to 150° C.; and a bladed rotor, which is supported for rotation in the tubular body, its blades being arranged as a helix and oriented for centrifuging the solid phase and simultaneously transporting it towards the outlet opening.

A further aspect of the present invention is the provision of a method for producing cocoa products, chocolate or chocolate-like products comprising the steps of: processing cocoa beans or nibs according to the method defined above, and mixing the obtained cocoa powder with at least one of cocoa aroma, cocoa butter or polyphenolic powder.

Another aspect of the present invention are cocoa products, chocolate or chocolate-like products obtained by the herein specified methods.

DETAILED DESCRIPTION OF THE INVENTION

For a more complete understanding of the present invention, reference is now made to the following description of the illustrative embodiments thereof:

Method for Processing Fermented Cocoa Beans and/or Nibs

The method for processing fermented cocoa beans or nibs according to the present invention is generally characterized by the steps of: (a) adding water to cocoa beans or nibs to form a suspension; (b) wet grinding said suspension; (c) subjecting said suspension to a heat treatment at a temperature of 70° C. or less; (d) separating the suspension into: a water phase (heavy phase), a fat phase (light phase) comprising cocoa butter, and a solid phase comprising cocoa powder and fluid components; (e) continuously separating the fluid components from the solid phase obtained in step (d) to obtain cocoa aroma and cocoa powder by supplying a flow of said solid phase to a mixing device; wherein the mixing device comprises: a cylindrical, tubular body with a horizontal axis having an inlet opening for the solid phase, an outlet opening for the dried solid phase and an optional outlet opening for a vapor phase comprising aromatics; end plates closing the tubular body at its opposite ends; a coaxial jacket heating or cooling the internal wall of the tubular body to a temperature of from 55° C. to 150° C., preferably to a temperature of from more than 65° C. and less than 140° C.; and a bladed rotor, which is supported for rotation in the tubular body, its blades being arranged as a helix and oriented for centrifuging the solid phase and simultaneously transporting it towards the outlet opening. It has been found that said method provides enhanced heat transfer to the solid phase and allows advantageously rapid, gentle, continuous and high-throughput drying/roasting of the cocoa powder.

Figure 1:
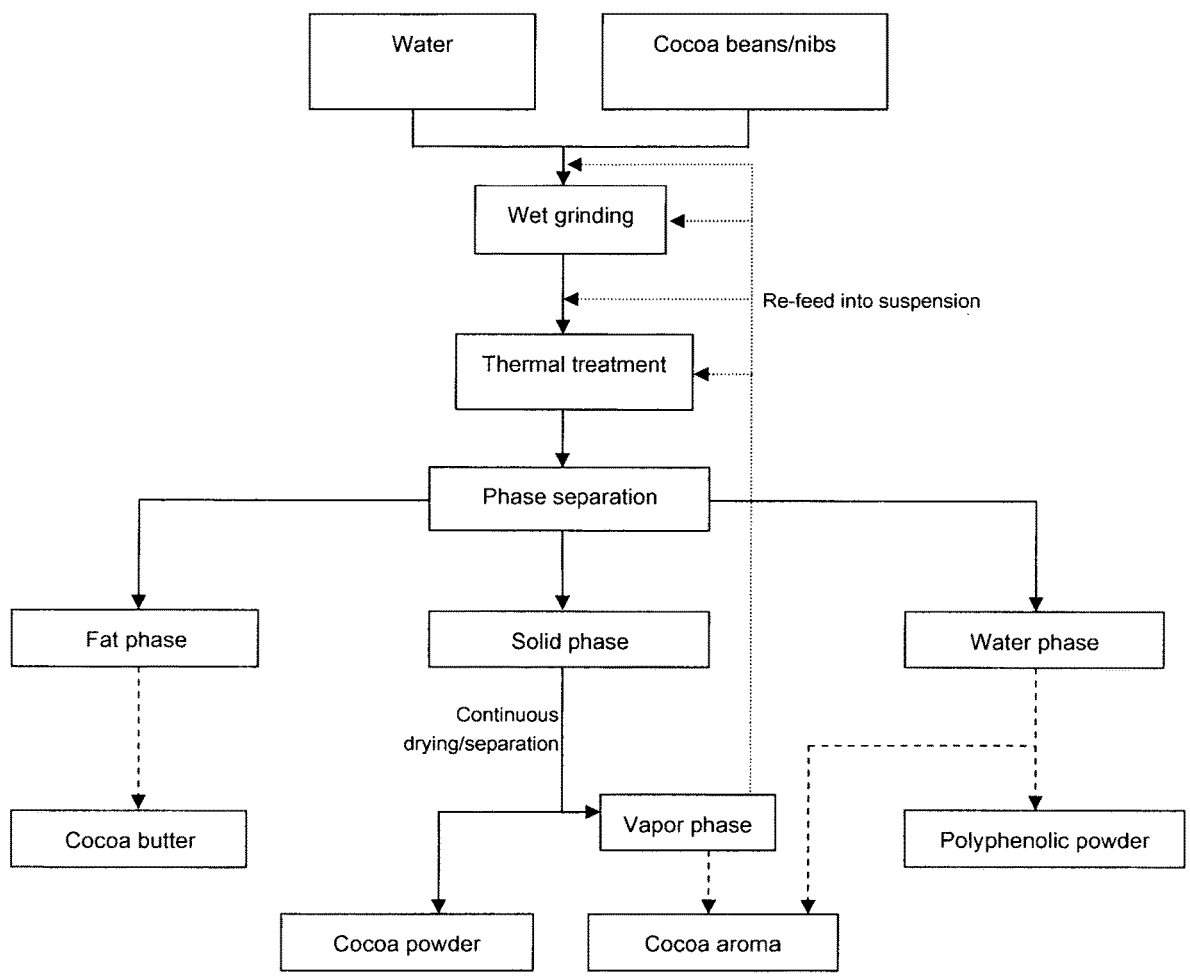
FIG. 1 schematically illustrates the method for processing cocoa beans or nibs according to an embodiment of the subject invention up to an optional provision of extracts obtained by the separated phases (dashed and dotted lines represent optional processing steps).

FIG. 1 schematically illustrates the method for processing cocoa beans or nibs up to an optional provision of extracts obtained by the separated phases.

The pre-treatment of the cocoa beans or nibs used for the processing method of the present invention is not particularly limited. Thus, the cocoa beans or nibs may be unfermented, underfermented, fermented, and/or incubated according to techniques known in the art or green beans with or without cocoa pulp/mucilage may be used freshly after separation from the pod.

The subject cocoa processing technique generally begins with forming a suspension of cocoa beans or nibs by adding water according to step a) either prior or during the grinding of the cocoa beans/nibs.

While not being particularly limited, the weight ratio of water to cocoa beans/nibs in the formed suspension is preferably between 1:1 to 6:1, more preferably 2:1 to 4:1, especially preferably about 3:1, which may advantageously affect the processability in the further steps (e.g. facilitated pumping, grinding and easier phase separation).

If desirable from the viewpoint of introducing additional flavors, alternative water-containing liquids may also be used as a source of water, preferably liquids selected from one or more of coffee, tea and liquids having water contents of from 60 to about 95% by weight, such as fruit juices, fruit juice concentrates, or milk, for example. In such a case, it is preferable that the water content in the formed suspension falls into the above-defined ratios. Since the thermal load in the further method steps is relatively low, temperature-sensitive flavors originating from said liquids are retained and may favorably interact with the primary and secondary flavors of the cocoa bean.

In order to obtain coffee-flavored cocoa products, coffee beans (whole or broken, unroasted or roasted) may be mixed to the cocoa beans/nibs when forming the suspension in water, provided that the cocoa beans/nibs form the major part in the bean mixture so that the content of coffee beans does not interfere or negatively affect the wet milling and phase separation steps. Preferably, the coffee bean content is less than 20% by weight of the bean mixture, more preferably less than 10% by weight.

In step b) the cocoa beans/nibs are subjected to a single or multiple wet grinding step(s), which result in bean particle sizes of preferably 50 µm or smaller, more preferably 40 µm or smaller, even more preferably 20 µm or smaller. Reducing the bean particles to such a size range substantially increases the exposed surface area of the bean particle material therefore allowing it to be more efficiently wet (e.g., with water rather than a chemical solvent) for improved extraction results (such as improved extraction of fats or lipids, aromatic substances, and/or polyphenols). The bean particle size reduction may be accomplished by using disc mills (e.g. perforated disc mill), colloid mills (e.g. toothed colloid mills), or corundum stone mills, for example. It is preferable that in at least one grinding step, cocoa bean cells are macerated to enable the solvent (water) to wet the cocoa bean material better due to increased available surface area of the macerated cocoa beans. The methods and devices used for wet milling are not particularly limited as long as the product of the wet milling method is not emulsified. For example, when using multiple grinding steps, a coarse wet grinding step (e.g., optionally with further water) may be carried out using a perforated disc mill, and the coarsely milled suspension may be pumped to a toothed colloid mill for a fine grinding step.

After the wet grinding step (b), the suspension is subjected to a thermal treatment at a temperature of no more than approximately 70° C. in order to reduce the overall thermal load and prevent emulsification (step (c)). From the viewpoint of a favorable balance of cocoa butter yield and preservation of desirable flavors, such as aromatics, anti-oxidants and/or vitamins, heating temperatures of from 43 to 65° C. are preferable. In terms of cocoa butter liquefaction and/or improved mechanical phase separation, a heating temperature range of from 45 to 50° C. is particularly preferable. Without being limited thereto, heating of the wet-milled suspension may be carried out by a scrap or tube heat exchanger.

Thereafter, phase separation is carried out in step (d) so that three phases, i.e. a water phase (heavy phase), a fat phase (light phase) and a solid phase are obtained, said fat phase comprising cocoa butter as a major component and solids and/or water as minor components, and said water phase comprising water and aromatic flavors. The solid phase comprises cocoa powder and fluid components. The cocoa powder may comprise residual cocoa butter in a content of up to 30% by weight, preferably less than 27% by weight, more preferably less than 20% by weight relative to the total weight of the cocoa powder. The term fluid components used herein denotes residues of species remaining in the solid phase after phase separation in step (d) that are fluid at room temperature, such as an aqueous phase (which may comprise hydrophilic polyphenols and aromatic flavors, for example) and volatile compounds.

Preferably, devices employing centrifugal forces may be utilized to achieve mechanical particle separations, such as decanters or nozzle separators. For instance, the suspension may be decanted to separate coarse or large or high mass solids from liquid(s) and then smaller and/or fine solid particles may be further separated from liquids and/or oil products may be separated from non-oil products.

Multiple phase separation and recombination steps may be employed to achieve an improved separation between the water phase (heavy phase), the fat phase (light phase) and the solid phase. For example, the fat phase obtained by an initial decanting step may be further filtered or centrifuged to separate remaining fine particles or water from the fat phase and the thus obtained fine particles and water may be recombined with the water and solid phases from the initial decanting step or at a later processing stage of said phases. Also, the water phase may be subjected to further purification steps, e.g. by filtration using vacuum rotation filters in order to reduce cloudiness of the liquid and to remove fine particles, which may be then recombined with the solid phase.

Upon separation of the three phases (i.e. the water phase (heavy phase), the fat phase (light phase) and the solid phase), these may be independently processed to separate cocoa butter (from the fat phase) and a polyphenolic concentrate (from the water phase), as is illustrated by FIG. 1.

The cocoa bean/nib processing method described herein further has the advantage that undesired acids (such as e.g. acetic acid formed during fermentation or formed or added prior to or during an incubation of the cocoa beans) leading to a sour or bitter taste in the final product or further hydrophilic components (such as bitter and/or astringent low molecular polyphenols (e.g. catechins)) may be removed via the water phase. The method of removing such undesired components is not particularly limited and may be carried out by any suitable method known in the art. For example, acids may be removed from the water phase by e.g. distillation (e.g. extractive distillation or reactive distillation), extraction (e.g. liquid-liquid) extraction, emulsion-type liquid membrane processes, salting out or combinations thereof. Removing the undesired hydrophilic components prior to subjecting the solid phase to a drying/roasting step is advantageous over conventional processes known in the art in that prolonged drying/roasting and high thermal loads upon the fermented cocoa beans (especially during roasting and conching) are not required in order to evaporate or decompose the components, so that high contents of aromatic flavors, anti-oxidants, vitamins may be preserved. Also, cocoa beans having relatively high acetic acid contents and/or being in varying fermentation stages may be used to produce high-quality cocoa products, such as chocolate. Moreover, the less bitter flavor profile of the resultant products does not require extensive addition of sugar or sweeteners to mask or compensate for the bitter taste.

Dried cocoa powder is obtained from the solid phase exiting the separator in step (e) of the presently claimed method. Cocoa aroma extract may be obtained through processing (e.g. concentrating) of the water phase and from the vapor phase exiting the separator in step (e).

As indicated above, the fat phase (light phase) may be filtered (e.g. by employing a vibrating screen) and/or conveyed to a 3-phase separator (e.g. centrifuge) to remove fine particles (which may be optionally added to the solid phase prior or during the drying/roasting step) and residue water (which may be optionally added to the water phase prior to aroma recovery). Cocoa butter is obtained by filtering the purified fat phase.

The (wet) solid phase obtained after separation in the three phases may be optionally treated with a heatable roll grinder to reduce particle size and begin pre-drying. Also, sugar, sugar solution and/or fruit juices may optionally be added to separated cocoa solids before drying to improve flavor development during step (e).

Figure 3:
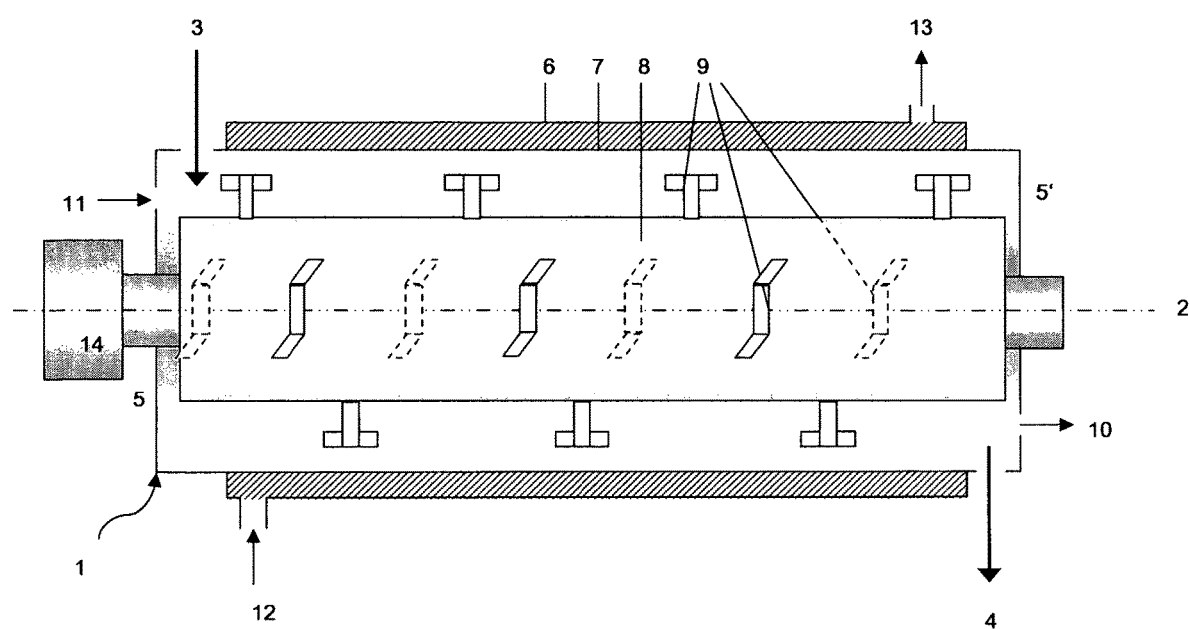
FIG. 3 schematically illustrates a mixing device used for the drying/separation step(s) in the methods according to the subject invention.

In accordance with the present invention, the (wet) solid phase obtained after separation in the three phases is dried and/or roasted in a single or multiple steps in parallel or in series, preferably in series, by continuously separating the fluid components from the solid phase obtained in step (d), which is effected by supplying a flow of said solid phase to one (or more) mixing device(s). Said mixing device, a schematic representation of which is depicted in FIG. 3, comprises: a cylindrical, tubular body (1) with a horizontal axis (2) having an inlet opening (3) for the solid phase, an outlet opening (4) for the dried solid phase and an optional outlet opening (10) for the vapor phase; end plates (5, 5') closing the tubular body at its opposite ends; a coaxial jacket (6) heating or cooling the internal wall (7) of the tubular body to a temperature of from 55° C. to 150° C., preferably to a temperature of from more than 65° C. and less than 140° C.; and a bladed rotor (8), which is supported for rotation in the tubular body (1), its blades (9) being arranged as a helix and oriented for centrifuging the solid phase and simultaneously transporting it towards the outlet opening (4). While not being particularly limited, it is preferred that diathermic oil or another fluid is used as a heating medium within the coaxial jacket (6) in order to keep the internal wall (7) of the body at a predetermined temperature.

During rotation of the bladed rotor (8), centrifugal forces result in formation of a thin, dynamic, tubular layer of the solid phase on the inner wall (7) of the tubular body, while the interaction of the solid phase with the blades (9) simultaneously mixes and advances the thin layer of the solid phase towards the outlet opening (4). Thus, effective heat exchange between the heated inner wall and the solid phase is achieved, which in combination with the mixing, requires relatively low heating temperatures and thereby results in a fast and gentle drying and roasting of the solid phase, so that in comparison with drying using conventional continuously or batch operated drum dryers, the solid phase retains higher concentrations of polyphenols (especially catechins, anthocyanidins and proanthocyanidins), antioxidants and/or aromatic flavors. Moreover, it has been surprisingly found that after drying and roasting using of the mixing device in step (e) for less than 10 minutes, typically less than 5 minutes, under conditions where the product temperature does not exceed 90° C., the overall concentration of roast and grill flavors (such as e.g. furan-2-carbaldehyde, 1-(2-furanyl)-ethanone, benzaldehyde, 5-methyl furfural, 2-furanmethanol, phenylmethanol, and/or 4-methylphenol) in the resulting cocoa powder and cocoa aroma is higher than after drying with a conventional drum dryer under sub-atmospheric pressure for several hours (typically about 10 hours) using a linear temperature gradient of from about 65 to 100° C. Thus, beside of the acceleration of the drying/roasting process, the presently claimed method reduces the thermal stress on the solid phase, so that—in contrast to conventional drying/roasting—simultaneously higher concentrations of roast flavors and higher overall contents of primary flavors, polyphenols, antioxidants and/or vitamins may be retained in the resulting extracts and final products.

Using the device described above advantageously allows the drying/roasting step and the separation of the roasted flavors and other aromatics to be carried out continuously and also remarkably accelerates the processing of cocoa beans up to the preparation of the cocoa powder (dry cocoa matter), resulting in overall processing durations for steps (a) to (e) of less than 20 minutes, typically less than 15 minutes, which is a remarkable improvement over the prior art and involves economic advantages when compared to conventional methods for the preparation of cocoa products.

In general, if there is microorganism spoilage of cocoa extracted materials (i.e. cocoa butter, cocoa powder, cocoa aroma and polyphenolic concentrate), such material can be deodorized employing a vacuum de-aerator, a high pressure treatment such as pascalisation is possible. However, since the method according to the present invention allows an advantageously fast processing of the cocoa beans/nibs, contamination with and growth of microorganisms may be ruled out or kept at a minimum.

As indicated above, the mixing device comprises an outlet (10) for a vapor phase (i.e. the vapors generated during the drying of the solid phase) which may serve several purposes, depending on its composition and temperature.

Preferably, a flow of hot air is supplied via optional inlet (11) to the mixing device simultaneously and concurrently with the flow of the solid phase to be dried, in order to enhance the heat distribution and drying of the solid phase inside the tubular body (1) and to drive the vapor phase towards the outlet (10).

In a preferred embodiment, the vapor phase exiting the mixing device is fed into the suspension before or during steps (b) or c), more preferably before or during step (b). Re-feeding the hot vapor phase accordingly contributes to or effects (pre-)heating of the suspension to the desired temperatures in step (c) by heat-exchange. Thereby, the energy expense required for step (c) may be effectively reduced, leading to a cocoa bean processing method with improved energy-efficiency. In addition, the phase separation in step (c) is improved. A further advantage is that aromatic flavors contained in the vapor phase are retained in the system, and may be further incorporated into each of the three phases in the step (d), so that an optimum yield of those components in the final extracts or products is ensured. Said embodiment will usually be preferred if the vapor phase contains relatively low amounts of aromatic flavors, such as e.g. roast aromas.

In a further preferable embodiment, which is especially advantageous if the vapor phase contains relatively high amounts of aromatic flavors, especially roast and grill flavors, the vapor phase exiting the mixing device in step (e) is collected as aroma phase, which may be optionally further processed by separating the flavor components to obtain cocoa aroma.

Albeit not necessary, it is practical to combine the collected aroma phase with the water phase obtained in the phase separation step (d), since the latter also contains desirable flavors, and to subject the combined liquids to a first concentration step to obtain cocoa aroma. In yet still further embodiments, recovered cocoa flavors may be enhanced by reverse flow distillation (e.g., to separate flavor components from water), which is preferably carried out under low pressure (less than 300 mbar) and room temperature in order to minimize the thermal load. After separation of cocoa flavors/aroma from the combined liquid, evaporation of excessive water may performed in an optional second concentration step to obtain polyphenolic powder. Removal of undesired water may be achieved by using evaporation techniques which, when employed, can desirably, result in water suspended flavor compounds and concentrated polyphenolic powder, respectively.

By using multiple mixing devices according to the above description in parallel, it is possible to combine the latter advantages, so that the vapor phase exiting one mixing device, which is preferably operated at relatively low internal wall heating temperatures, may be fed into the suspension before or during steps (b) or (c), more preferably before or during step (b), and the vapor phase exiting another device, which is preferably operated at relatively high internal wall heating temperatures, may be collected as aroma phase for aroma recovery.

Figure 2:
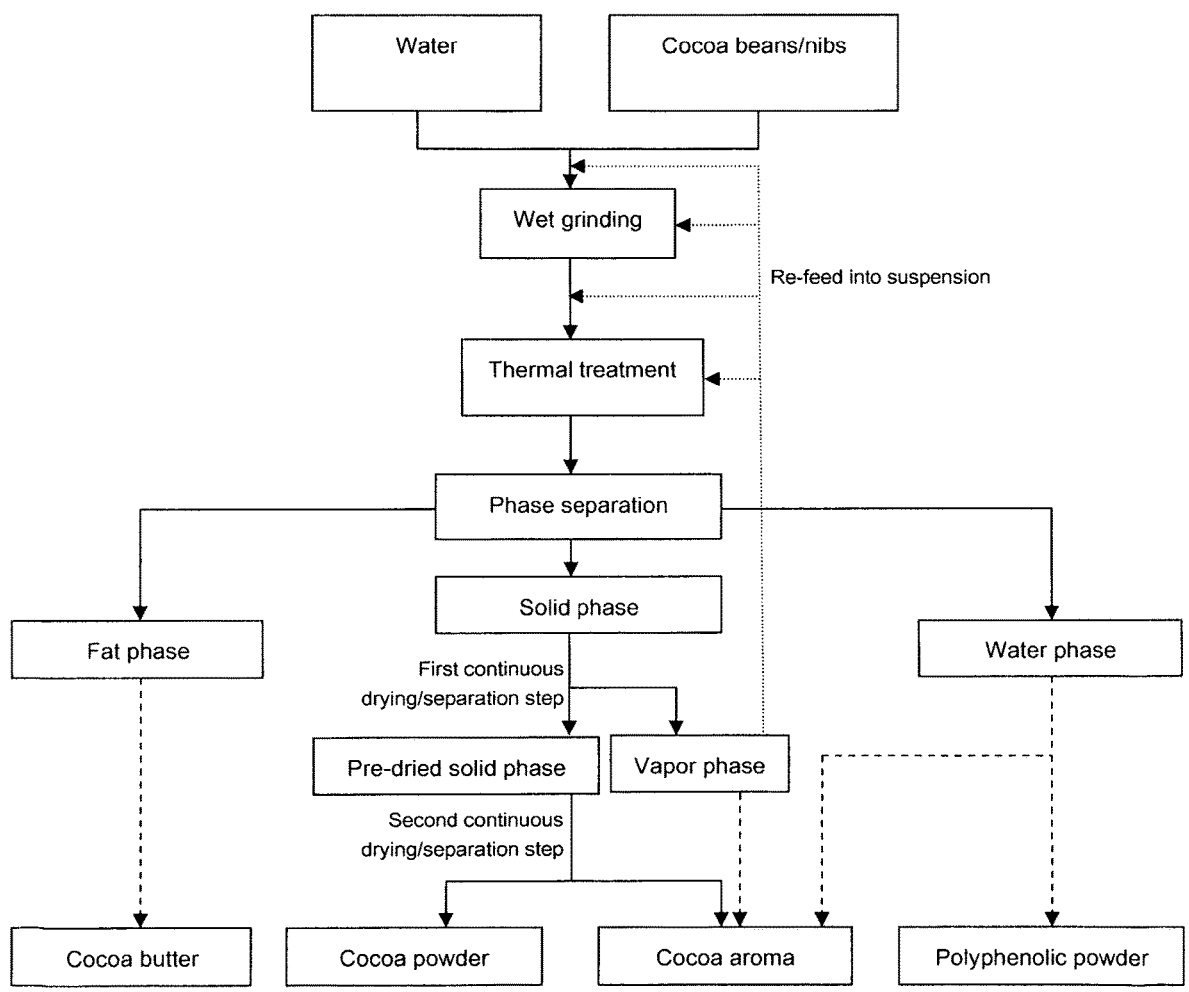
FIG. 2 schematically illustrates the method for processing cocoa beans or nibs according to a preferred embodiment of the subject invention up to an optional provision of extracts obtained by the separated phases (dashed and dotted lines represent optional processing steps).

In a preferred embodiment of the present invention, which is schematically illustrated in FIG. 2, step (e) comprises two substeps, namely: (e1) continuously pre-drying the solid phase obtained in step (d) by supplying a flow of said solid phase to a first mixing device; and (e2) continuously drying the pre-dried solid phase obtained in step (e1) by supplying a continuous flow of the pre-dried solid phase to a second mixing device; wherein each of the first and second mixing devices comprise: a cylindrical, tubular body (1) with a horizontal axis (2) having an inlet opening (3) for the solid phase, an outlet opening (4) for the dried solid phase and at least one outlet opening (10) for exhaust vapors; end plates (5, 5') closing the tubular body at its opposite ends; a coaxial jacket (6) heating or cooling the internal wall (7) of the tubular body to a temperature of from 55° C. to 150° C.; and a bladed rotor (8), which is supported for rotation in the tubular body (1), its blades (9) being arranged as a helix and oriented for centrifuging the solid phase and simultaneously transporting it towards the outlet opening (4). In other words, the first and second mixing devices both exhibit the characteristics of the mixing device described initially above. Conducting the drying/roasting process in said manner results in an excellent balance of drying performance, process and energy efficiency, development of roast flavors and high yield of primary flavors, polyphenols, antioxidants and/or vitamins.

Preferably, the first and second mixing devices are operated under different conditions (e.g. internal wall heating temperatures, vapor phase outlet connection) or exhibit different dimensions. More preferably, the internal wall heating temperature of the first mixing device is lower than the internal wall heating temperature of the second mixing device.

Preferably, the internal wall of the tubular body of the first mixing device is heated to a temperature of between 70 and 110° C., preferably between 80 and 100° C. In a more preferred embodiment, the temperature of the internal wall (7) of the tubular body of the first mixing device in the pre-drying step (e1) is heated so that the temperature of the pre-dried solid phase exiting the outlet (4) is between 70 and 100° C., more preferably between 80 and 90° C.

In a preferred embodiment, the first mixing device is operated under conditions where the pre-dried solid phase obtained after step (e1) has a water content of 3 to 7% by weight, more preferably 4 to 6% by weight.

It is further preferred that the vapor phase exiting the first mixing device is fed into the suspension before or during steps (b) or (c), more preferably before or during step (b).

Preferably, the internal wall of the tubular body of the second mixing device is heated to a temperature of between 100 and 150° C., preferably 120 to 145° C. More preferably, the temperature of the internal wall (7) of the tubular body of the second mixing device in the drying step (e2) is heated so that the temperature of the solid phase exiting the outlet (4) is between 110 and 145° C., more preferably between 120 and 135° C.

It is further preferred the vapor phase exiting the second mixing device in step (e2) is collected as aroma phase for aroma recovery.

In a preferred embodiment, the second mixing device is operated under conditions where the solid phase obtained after step (e2) has a water content of less than 3% by weight, more preferably less than 2% by weight, even more preferably less than 1% by weight.

In general, it is preferable that in the mixing device(s) used in step (e) or any of the substeps (e1) and (e2), the bladed rotor(s) is driven at a speed of from 300 to 1300 rpm, more preferably between 700 and 1100 rpm, further preferably between 800 and 1000 rpm.

In a preferred embodiment, the duration of step (e) (or the duration of the sum of substeps of step (e)) is shorter than 15 minutes, more preferably shorter than 10 minutes, in order to prevent prolonged exposure of the (pre-dried) solid phase to elevated temperatures.

Cocoa Powder Extract

In a second embodiment, the present invention relates to cocoa powder produced in accordance with method steps set forth in the first embodiment outlined above. This extract represents a staring material for a large variety of high-quality chocolate products, wherein high concentrations of water-soluble aroma components, polyphenolic components and vitamins of the cocoa beans/nibs and preserved in high concentrations due to the low thermal burden, while water-soluble undesired hydrophilic components (such as acids or bitter and/or astringent low molecular polyphenols (e.g. catechins)) have been optionally removed.

The dried cocoa powder prepared by the method of the present invention typically exhibits a water content of less than 2% by weight, usually less than 1.5% by weight and a fat content of typically 30% by weight or less, preferably less than 27% by weight or less, more preferably less than 20% by weight, each based on the total weight of the dried cocoa powder.

As has been found by GC-MS analysis of the flavor components, the dried cocoa powder obtained by the presently claimed method comprise a higher total concentration of raw/earthy, fruity/flowery, malty/buttery, and grilled/roasted aromas, and a lower concentration of stinging/acidic flavors when compared to commercially available cocoa powder.

Figure 4:
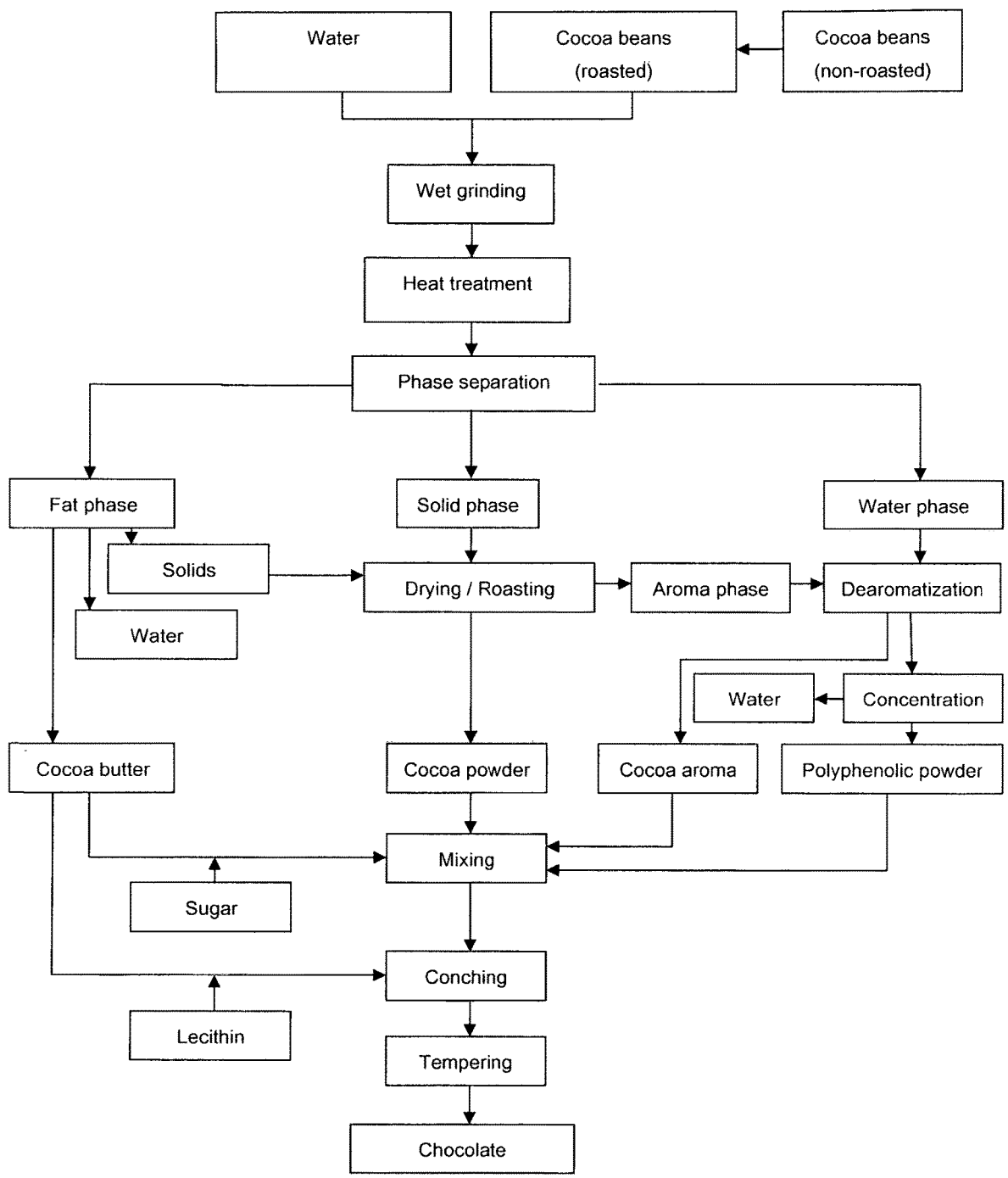
FIG. 4 illustrates an exemplary method for preparing dark chocolate.

For the purpose of quantifying the aroma profile, cocoa powder, cocoa aroma, polyphenolic powder and cocoa butter extracts have been produced in accordance with the exemplary scheme illustrated by FIG. 4, wherein the drying/roasting step has been carried out by using a mixing device in accordance to the above description. Overall, FIG. 4 shows an exemplary method of processing cocoa beans from the non-roasted bean to the preparation of a chocolate product.

The abovementioned flavor types have been quantified in the extract obtained by the presently claimed method and a commercially available cocoa powder. Specifically, the raw/earthy flavors have been quantified via GC-MS by the total concentration of pyrazine derivatives (i.e. 2-acetylpyrazine, methylpyrazine, tetramethylpyrazine, 2,3-dimethylpyrazine, 2,6-dimethylpyrazine, 2,5-dimethylpyrazine, trimethylpyrazine, ethylpyrazine, 2-ethyl-3-methylpyrazine, 2-ethyl-6-methylpyrazine, 2-ethyl-5-methylpyrazine, 2-ethyl-3,6-dimethylpyrazine, 2-ethyl-3,4-dimethylpyrazine, 2,3-diethyl-5-methylpyrazine, 2-isopropyl-3-methoxypyrazine and 2-isobutyl-3-methoxypyrazine); the fruity/flowery flavors have been quantified by the total concentration of 1-methyl-1H-pyrrole, ethyl-2-methyl butanoate, 3-methylbutyl acetate, 2-heptanone, hexyl acetate, linalool, benzyl alcohol, 2-phenylethanol, ethyl cinnamate, 2-phenethyl acetate; the malty/buttery flavors have been quantified by the total concentration of vanillin, isobutanal, 2-methyl butanal, isovaleradehyde, acetoin and butane-2,3-dione; the grilled/roasted flavors have been quantified by the total concentration of furfural, 2-acetylfurane, benzaldehyde, 5-methylfurfural, 2-furanmethanol, benzyl alcohol, 4-methylphenol; and the stinging/acidic flavors have been quantified by the total concentration of acetic acid, propionic acid, isobutyric acid, 2-methylbutyric acid, 3-methylbutanoic acid, and pentanoic acid. The results of the measurements are shown in Table 1.

TABLE 1

| Flavor type | Concentration in cocoa powder [mg/kg] | |
| --- | --- | --- |
| | Invention | Comparative Example |
| raw/earthy | 1.066 | 0.728 |
| fruity/flowery | 1.982 | 2.695 |
| malty/buttery/roasty | 7.132 | 4.081 |
| stingy/acidic | 40.05 | 100.20 |

Table 1 shows that the total content of flavors that are perceived as pleasant is substantially higher in the cocoa powder obtained by the method of the present invention (10.180 mg/kg) when compared to conventional cocoa powder (7.504 mg/kg), while the concentration of stingy/acidic flavors is remarkably lower, since a large fraction thereof is extracted via the water phase.

The total polyphenol content of the defatted cocoa solid is typically at least 40 mg of ECE (epicatechin equivalents) per gram of defatted dry mass, preferably more than 50 mg of ECE per g of defatted dry mass, further preferably more than 55 mg of ECE per g of defatted dry mass. The total polyphenol content may be determined by using a Folin-Ciocalteu assay with (-)-epicatechin as standard, in accordance with the method disclosed in Folin-Ciocalteu index, *Off. J. Eur. Communities* 1990, 41, 178-179, and Cooper et al., *J. Agric. Food Chem* 2008, 56, 260-265.

It has been found that by use of conventional drum dryers instead of the mixing device described above, the combination of the abovementioned properties cannot be achieved since the prolonged heating durations required for the development of the same concentrations of grill/roast flavors lead to a substantial loss or decomposition of polyphenols, antioxidants and/or vitamins.

In the cocoa aroma produced in accordance with method steps set forth in the first embodiment outlined above, the stinging/acidic flavors (i.e. the total concentration of acetic acid, propionic acid, isobutyric acid, 2-methylbutyric acid, 3-methylbutanoic acid, and pentanoic acid) typically make up less than 7%, preferably less than 5% by weight based on the total content by weight of raw/earthy, fruity/flowery, malty/buttery, grilled/roasted and stinging/acidic flavors represented by the marker compounds set out above.

In a preferred embodiment, the cocoa aroma is preferably obtained by collecting the vapor phase obtained in step (e2) as aroma phase, combining said aroma phase with the water phase, and subjecting the combined liquid to one or more concentration step(s).

Exemplary methods of manufacturing chocolate and chocolate-like products on the basis of the extracts obtained in the method according to the first embodiment, respectively, will be given hereinbelow.

Methods for Manufacturing Cocoa Products, Chocolate or Chocolate-Like Products The cocoa powder produced in accordance with method steps set forth in the first embodiment may be used for the preparation of a large variety of cocoa products, chocolate or chocolate-like products, as will be described in the following third embodiment.

The method for producing chocolate or chocolate-like products according to the present invention generally comprises the steps of: processing cocoa beans or nibs according to the first embodiment described above; mixing the obtained cocoa powder with at least one of cocoa aroma, cocoa butter or polyphenolic powder; and conching said mixture.

The term "chocolate-like product", as used herein, refers to a product which falls into the legal definition of a "chocolate" of at least one country, but not all countries, since it deviates in the type and/or the content range of a component legally defining chocolate.

Figure 5:
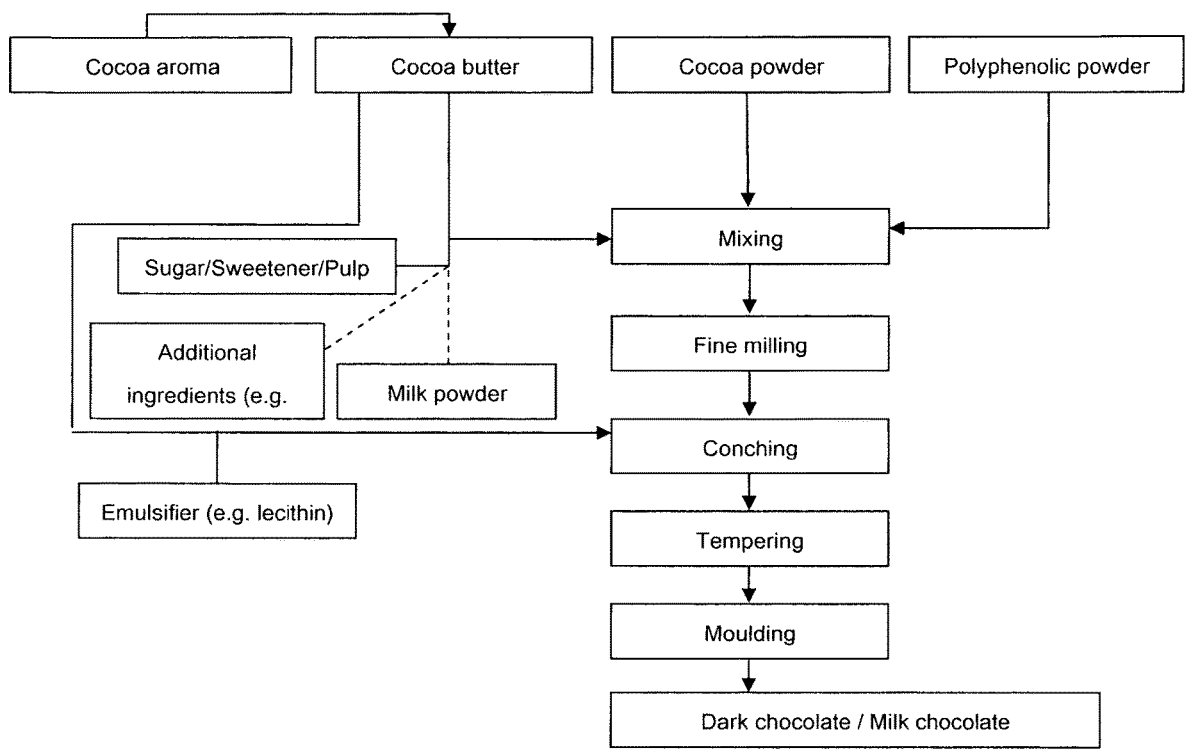
FIG. 5 schematically illustrates an exemplary method for preparing dark chocolate/milk chocolate using the cocoa powder obtained after separation and processing of the fat, solid and water phases.

FIG. 5 illustrates an example of a method for the preparation of dark chocolate and milk chocolate, wherein cocoa aroma obtained from the step (e) or (e2) (optionally together with the product obtained by dearomatisation of the water phase) are first added to the cocoa butter. Before being subjected to a conching step, the dried and roasted cocoa powder obtained from the step (e) or (e2) are mixed with the cocoa butter with added aroma and fine milled. Polyphenolic powder may be added to the mixture as desired to provide more intense flavors and even higher contents of antioxidants in the final product. Additional tailoring of flavor or development of flavor may be performed by adding one or more of sugar, sweetener, cocoa pulp and/or fruit juices. For the preparation of milk chocolate, milk powder is further added, preferably prior to the mixing step. Optionally, an emulsifying agent (e.g. lecithin) may be added prior to conching to reduce viscosity, control sugar crystallization and the flow properties of chocolate, and help in the homogeneous mixing of ingredients. Also, additional ingredients and flavors, such as e.g. vanilla, rum and so on may be added prior to or during the conching step.

The conching process redistributes into the fat phase the substances from the dry cocoa that create flavor, while removing unwanted acetic, propionic, and butyric acids from the chocolate, reducing moisture, and mellowing the flavor of the product. The temperature of the conche is controlled and varies depending on the different types of chocolate (from around 49° C. for milk chocolate to up to 82° C. for dark chocolate). While being to some degree dependent on the temperature, the conching duration in conventional chocolate manufacturing processes generally ranges from 16 up to 72 hours in order to achieve good results. In the method according to the present invention, the conching duration is preferably less than 16 hours, more preferably less than 12 hours, typically 10 hours or less. Thus, a loss of desirable aroma characteristics as observed at long conching times does not occur. In addition, since undesired acids may be removed from the product via the water phase, a mellow taste is achieved in short conching durations.

Overall, chocolate or chocolate-like products obtained by the methods of the present invention exhibit favourable organoleptic properties and comprise both high concentrations of roast flavors and higher overall contents of primary flavors, polyphenols, antioxidants and/or vitamins.

As an example, the polyphenol contents of cocoa beans, a (wet) solid phase and a dark chocolate obtained by the method illustrated in FIG. 4 have been analyzed by spectrophotometric methods. Specifically, the total polyphenol content has been determined by using a Folin-Ciocalteu assay with (-)-epicatechin as standard, in accordance with the method disclosed in Folin-Ciocalteu index, *Off. J. Eur. Communities* 1990, 41, 178-179, and Cooper et al., *J. Agric. Food Chem* 2008, 56, 260-265. The total flavonoid content has been determined by means of an aluminum chloride colorimetric assay in accordance with Emelda et al. *Int. J. ChemTech Res.* 2014, 6(4), 2363-2367, using (-)-epicatechin as standard. An acid-butanol method (such as e.g. Bates-Smith assay or a Porter method) using procyanidin B2 as standard has been employed to spectrophotometrically determine the content of proanthocyanidine. The results are given in Table 2.

TABLE 2

|  | raw cocoa beans (non-roasted) | raw cocoa beans (roasted) | solid phase after phase separation | chocolate product |
|---|---|---|---|---|
| total polyphenol concentration (mg ECE*/g defatted dry matter) | 84.1 ± 2.7 | 64.4 ± 1.3 | 60.4 ± 2.7 | 23.5 ± 0.6 |
| flavonoid concentration (mg ECE/g defatted dry matter) | 57.8 ± 2.9 | 40.8 ± 1.8 | 37.2 ± 2.4 | 14.1 ± 0.3 |
| proanthocyanidine concentration (mg PCE**/g defatted dry matter) | 7.0 ± 0.6 | 5.2 ± 0.1 | 5.5 ± 0.1 | 1.8 ± 0.2 |

*ECE = (−) epicatechin equivalents
**PCE = procyanidin B2 equivalents

It is shown that the methods of the present invention ensure that the high contents of polyphenols, flavonoids and/or proanthocyanidines present in the cocoa beans are preserved inter alia through the solid phase/cocoa powder, so that beside of the favourable aroma profile, optimum yields of healthy ingredients may be obtained in the final chocolate product.

The chocolate or chocolate-like products obtained by the methods of the present invention may take any suitable form and may, for example, be packaged and sold as a block or a bar, be filled and may be used as a coating, be used in other confectionery and bakery applications (e.g. as a cake coating or filling, a biscuit coating or filling, a sponge coating or filling or a coating layer for an ice cream). Also, the obtained chocolate or chocolate-like products may optionally have further additives added prior to the final use of the product.

Once given the above disclosure, many other features, modifications, and improvements will become apparent to the skilled artisan.

REFERENCE MATERIALS 1 cylindrical tubular body
2 horizontal axis
3 solid phase inlet opening
4 dried solid phase outlet opening
5,5' end plates
6 coaxial jacket
7 internal wall of tubular body
8 bladed rotor
9 blade(s)
10 vapor phase outlet opening
11 hot air inlet opening
12 heating/cooling medium inlet opening
13 heating/cooling medium outlet opening
14 motor

The invention claimed is:

1. A method for processing cocoa beans or nibs comprising the steps of:
 (a) adding water to cocoa beans or nibs to form a suspension;
 (b) wet grinding said suspension;
 (c) subjecting said suspension to a heat treatment at a temperature of 70° C. or less;
 (d) separating the suspension into:
  a water phase (heavy phase),
  a fat phase (light phase) comprising cocoa butter, and
  a solid phase comprising cocoa powder and fluid components;
 (e) continuously separating the fluid components from the solid phase obtained in step (d) to obtain cocoa aroma and cocoa powder by supplying a flow of said solid phase to a mixing device;
 wherein the mixing device comprises: a cylindrical, tubular body (1) with a horizontal axis (2) having an inlet opening (3) for the solid phase, an outlet opening (4) for the dried solid phase and an optional outlet opening (10) for a vapor phase comprising cocoa aroma; end plates (5,5') closing the tubular body (1) at its opposite ends; a coaxial jacket (6) heating or cooling the internal wall (7) of the tubular body (1) to a temperature of from 55° C. to 150° C.; and a bladed rotor (8), which is supported for rotation in the tubular body, its blades being arranged as a helix and oriented for centrifuging the solid phase and simultaneously transporting it towards the outlet opening;
 wherein the solid phase exiting the outlet opening (4) has a temperature between 80° C. and 145° C.; and
 wherein the cocoa powder has a total polyphenol content of more than 55 mg of ECE (epicatechin equivalents) per gram of defatted dry mass, and a water content of less than 2% by weight.

2. The method for processing cocoa beans or nibs according to claim 1, wherein the vapor phase exiting the mixing device is fed into the suspension before or during steps (b) or (c).

3. The method for processing cocoa beans or nibs according to claim 1, wherein the internal wall (7) of the tubular body (1) of the mixing device is heated to a temperature of between 80 and 140° C.

4. The method for processing cocoa beans or nibs according to claim 1, wherein the solid phase obtained after step (d) has a water content of 50 to 75% by weight.

5. The method for processing cocoa beans or nibs according to claim1 , wherein continuously separating the fluid components from the solid phase in step (e) comprises the steps of:
 (e1) continuously pre-drying the solid phase obtained in step (d) by supplying a flow of said solid phase to a first mixing device; and
 (e2) continuously drying the pre-dried solid phase obtained in step (e1) by supplying a continuous flow of the pre-dried solid phase to a second mixing device;
 wherein each of the first and second mixing devices comprise: a cylindrical, tubular body (1) with a horizontal axis (2) having an inlet opening (3) for the solid phase, an outlet opening (4) for the dried solid phase and an optional outlet opening (10) for a vapor phase comprising cocoa aroma; end plates (5,5') closing the tubular body (1) at its opposite ends; a coaxial jacket (6) heating or cooling the internal wall (7) of the tubular body (1) to a temperature of from 80° C. to 150° C.; and a bladed rotor (8), which is supported for rotation in the tubular body, its blades being arranged as a helix and oriented for centrifuging the solid phase and simultaneously transporting it towards the outlet opening.

6. The method according to claim 5, wherein the internal wall (7) of the tubular body (1) of the first mixing device is heated to a temperature of between 80 and 100° C., and/or wherein the internal wall (7) of the tubular body (1) of the second mixing device is heated to a temperature of between 100 and 150° C.

7. The method for processing cocoa beans or nibs according to claim 1, wherein a flow of hot air is supplied via an inlet opening (11) to the mixing device(s) simultaneously and concurrently with the flow of the solid phase to be dried.

8. The method for processing cocoa beans or nibs according to claim 1, wherein the bladed rotor of the mixing device(s) is driven at a speed of from 600 to 1100 rpm.

9. The method for processing cocoa beans or nibs according to claim 5, wherein the first vapor phase exiting the first mixing device in step (e1) is fed into the suspension before or during steps (b) and (c).

10. The method for processing cocoa beans or nibs according to claim 5, wherein the pre-dried solid phase obtained after step (e1) has a water content of 3 to 7% by weight.

11. The method for processing cocoa beans or nibs according to claim 5, wherein the vapor phase obtained in step (e2) is collected as aroma phase, said aroma phase is combined with the water phase, and the combined liquid is subjected to one or more concentration step(s) to obtain a cocoa aroma extract.

12. Cocoa powder prepared by the method according to claim 1.

13. The method according to claim 6, wherein the internal wall (7) of the tubular body (1) of the first mixing device is heated to a temperature of between 80 and 100° C., and/or wherein the internal wall (7) of the tubular body (1) of the second mixing device is heated to a temperature of between 120 to 140° C.

14. The method for processing cocoa beans or nibs according to claim 8, wherein the bladed rotor of the mixing device(s) is driven at a speed between 750 and 1050 rpm.

15. A method for producing chocolate or chocolate-like products comprising the steps of:
processing cocoa beans or nibs according to claim 1,
mixing the obtained cocoa powder with at least one of cocoa aroma, cocoa butter or polyphenolic powder; and
conching said mixture.

16. Chocolate or chocolate-like products obtained by the method according to claim 15, wherein the cocoa powder has a total polyphenol content of more than 55 mg of ECE (epicatechin equivalents) per gram of defatted dry mass, and a water content of less than 2% by weight.

* * * * *

UNITED STATES PATENT AND TRADEMARK OFFICE
CERTIFICATE OF CORRECTION

PATENT NO. : 11,452,301 B2
APPLICATION NO. : 15/742446
DATED : September 27, 2022
INVENTOR(S) : Tilo Huhn Page 1 of 1

It is certified that error appears in the above-identified patent and that said Letters Patent is hereby corrected as shown below:

In the Claims

Column 14, Claim 1, Line 18:
"phase and an optional outlet opening"
Should read:
--phase and an outlet opening--.

Column 14, Claim 5, Line 59:
"an optional outlet opening"
Should read:
--an outlet opening--.

Signed and Sealed this
Eighth Day of October, 2024

Katherine Kelly Vidal
*Director of the United States Patent and Trademark Office*